(12) United States Patent
Clampitt

(10) Patent No.: US 11,841,605 B1
(45) Date of Patent: Dec. 12, 2023

(54) TRAIL CAMERA CAMOUFLAGING DEVICE

(71) Applicant: Intuitive Corporation, Wilder, ID (US)

(72) Inventor: Darwin A. Clampitt, Wilder, ID (US)

(73) Assignee: Intuitive Corporation, Wilder, ID (US)

( * ) Notice: Subject to any disclaimer, the term of this patent is extended or adjusted under 35 U.S.C. 154(b) by 9 days.

(21) Appl. No.: 17/813,247

(22) Filed: Jul. 18, 2022

(51) Int. Cl.
  *G03B 17/56* (2021.01)
  *A01M 31/00* (2006.01)

(52) U.S. Cl.
  CPC ......... *G03B 17/561* (2013.01); *A01M 31/002* (2013.01)

(58) Field of Classification Search
  CPC ............ G08B 13/19619; G08B 15/001; H04N 23/50; H04N 23/51
  See application file for complete search history.

(56) References Cited

U.S. PATENT DOCUMENTS

| | | | |
|---|---|---|---|
| 6,449,431 B1 * | 9/2002 | Cuddeback | A01M 31/002 396/433 |
| 7,975,973 B1 * | 7/2011 | Weeden | G03B 17/561 248/217.4 |

OTHER PUBLICATIONS

Screen captures of YouTube video clip entitled "High Point's Stabilizer Bow Camo," 2 pages, uploaded on Jun. 13, 2017 by user "High Point Archery". Retrieved from Internet: <https://www.youtube.com/watch?v=R2xgHXOWfk0>. (Year: 2017).*

* cited by examiner

*Primary Examiner* — Noam Reisner
(74) *Attorney, Agent, or Firm* — Scott Swanson; Shaver & Swanson, LLP

(57) ABSTRACT

A trail camera mounting and camouflaging device having a trail camera mounting point and a mounting bracket for mounting the camouflaging device to a substrate, such as a tree or other material. The camouflaging device has a series of flexible arms that extend outward away from the mounting bracket. The flexible arms are configured to be bent and otherwise manipulated into retaining the shape of the bend or manipulation. Each flexible arms has one or more fingers attached to the flexible arm. The fingers can utilize a flexible material such as a twist tie or can otherwise be configured with a clipping or clamping motion to attach foliage to the fingers. The flexible arms and fingers are configured to be manipulated and bent into position, such that foliage or other material camouflages the trails camera without blocking the sensor(s) of the trail camera.

17 Claims, 6 Drawing Sheets

TRAIL CAMERA CAMOUFLAGING DEVICE

FIELD OF THE INVENTION

The presently disclosed technology relates to a device for camouflaging a trail camera. More particularly, the present invention is a device having an adjustable frame for retaining camouflaging materials around a trail camera.

BACKGROUND OF THE INVENTION

Trail cameras are a popular device utilized for remotely photographing and/or videoing activities utilizes a camera with a timer or sensor. In particular, many of these cameras utilize motion sensing technology to activate when a human or animal passes in front of the camera. Trail cameras are often referred to as game cameras or remote cameras.

The cameras are supplied typically as a rectangular unit having one or more cameras, a flash, and varying sensors, such as motion sensors and light sensor. Often utilize an infrared camera as well as a standard daylight operating camera. This allows the trail camera to take photographs both during daylight hours and hours of low ambient light. Trail cameras are often used by hunters in scouting for game as well as for security purposes, such as detecting trespassers. These cameras are often configured to be attached to a tree or a fence or other substrate.

While these cameras can be painted or a have a slip cover placed over the camera with an opening configured in the cover to allow the lens and material to see through. However, this does not provide as effective of camouflaging as using natural materials can provide. While natural materials can be utilized, providing an adequate field of view and maintaining this field of review of the camera can be difficult.

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a camouflaging device for use with a trail camera. The camouflaging device has a frame configured for mounting a trail camera to the device. The frame has a mounting bracket configured for connection to a trail camera. The frame is configured for mounting on a substrate, such as a tree, wall, fence, post, or other mounting surface by a mounting device, such as a mounting screw, straps, cords, hangers or other mounting device. The mounting bracket in a preferred embodiment defines an opening configured for receiving a mounting screw for attaching said mounting bracket to a substrate. This opening can preferably be formed by an annular ring, such as a washer. A plurality of flexible arms extends from the mounting bracket. The mounting bracket can be formed by overlapping portions of the arms, or alternatively the arms can be attached to the mounting bracket. The flexible arms are configured to be bent into a shape and configured to be resilient so as to retain the shape into which the arms are bent.

A plurality of flexible fingers is attached to the flexible arms. The said flexible fingers are configured for retaining a camouflaging material, such as a natural or synthetic material. This material can include grasses, branches, leaves, or other artificial (synthetic) or natural material. A mounting screw is provided for attaching said mounting bracket to a substrate. The frame is configured for attachment thereto of a trail cameral. In a preferred embodiment the mounting screw has a first end and a second end. The first end of the mounting screw is configured to attach to a substrate, such as a tree, fence, or other mounting surface, by mounting screw threads. The mounting screw has two opposing mounting screw arms configured or rotating the mounting screw to embed the mounting screw into a substrate. The second end of the mounting screw preferably provides the configuration to attach the frame to the trail camera by the threaded bolt configured for attaching to a trail camera.

In a preferred embodiment the frame has four flexible arms. The mounting bracket is formed by the intersection of the four arms forming a square or rectangle, with a washer positioned within the box or rectangle. Preferably the mounting screw has a washer that aligns with the washer of the frame to attach the frame to the substrate.

The flexible fingers can be attached to the arms at a variety of positions on the arms. The flexible fingers can be positioned at the ends of the arms, or between the ends of the arms and the mounting bracket. The fingers can utilized smaller diameter material than the arms, so as to provide for ease of connection and retention of camouflaging materials. The flexible fingers can be made of strands of metal, wire, clips, hooks, clamps, or a variety of materials providing the same functionality. In a preferred embodiment the device comprises eight flexible fingers positioned on four arms.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

DETAILED DESCRIPTION OF THE INVENTION

Figure 1:
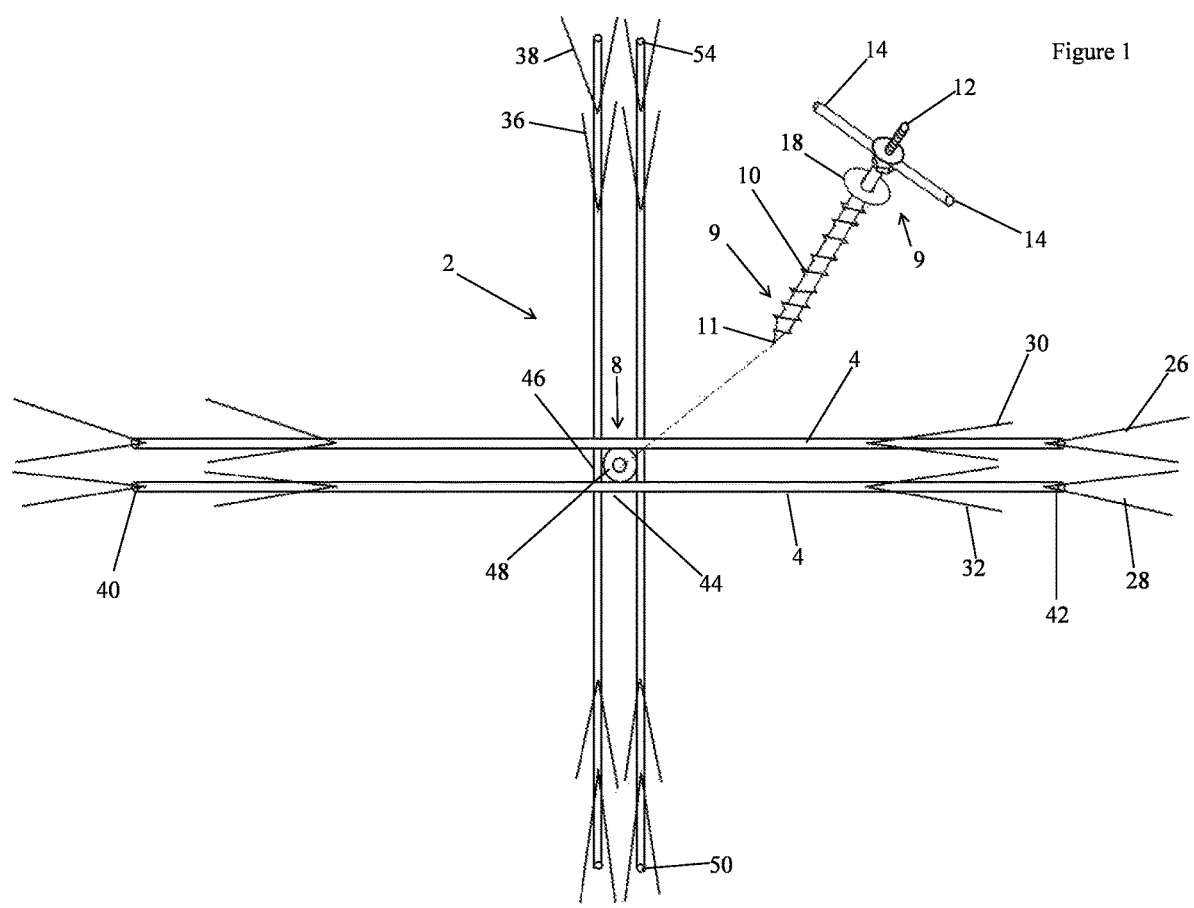
FIG. 1 illustrates a preferred embodiment of camouflaging device.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a camouflaging device to which a trail camera is attached. The device 2 has a mounting bracket 8 positioned at a center of the frame. Flexible arms 4, 6 extend outward from the mounting bracket. In the depicted embodiment, the mounting bracket 8 utilizes a washer. A mounting screw 9 is provided for attaching the device 2 to a tree or other substrate. A first end 11 of the mounting screw has threads configured for attaching to the substrate as well as a driving point 11 for embedding the device to a substrate. The mounting screw has two arms 14 that extend outward from the longitudinal axis of the mounting screw. Alternatively or additionally straps, cords, hangers or other mounting devices can be used. The mounting screw or alternate attachment mechanisms are referred to collectively as a mounting device.

The second end 12 of the mounting screw is configured as a bolt for threaded engagement with the female opening of a trail camera. Arms 4, 6 extend outward away from the mounting bracket. In the depicted embodiment, four arms are provided with the mounting bracket positioned at the center of each arms, such that the arms form a frame around the mounting bracket or washer. The flexible arms 4, 6 are configured with the material that after being flexed or configured into position, retain that position. This allows the arms to be bent or configured to be positioned in front of or around the trail camera. Each flexible arm has a series of fingers 26, 28, 30, 32, 36, 38. The flexible figures are configured to retain materials such as foliage in the fingers. The fingers are typically a smaller diameter wire than the frame. The smaller diameter wire can be utilized in a twist tie motion to secure material, or alternative attachments can be utilized. The fingers can be configured such that a twisting action secures the foliage similar to a twist tie. The fingers can incorporate hooks, clamps, clips or other materials. The arms for a frame that is bendable and positionable around the camera, with the fingers configured for attachment of camouflaging material to the arms.

The mounting screw has a washer 18 configured on the mounting screw. The mounting screw washer 18 is configured for engagement with the washer 48 of the mounting bracket. The washer 48 of the mounting bracket can be welded, glued, or otherwise affixed to the arms. In the depicted embodiment the mounting bracket is formed by the intersection of the four arms. Alternatively the arms can extend outward and be attached to the mounting bracket.

The fingers can be positioned at the distal end of each arm, as illustrated by fingers 26, 28, or alternatively between the mounting bracket 8 and the end 40, 42 of each of the arms. The arms are spaced apart such that a medial section of each arm 44, 46 forms the mounting bracket. In the depicted embodiment the washer is connected to each medial section of each arm.

Figure 2:
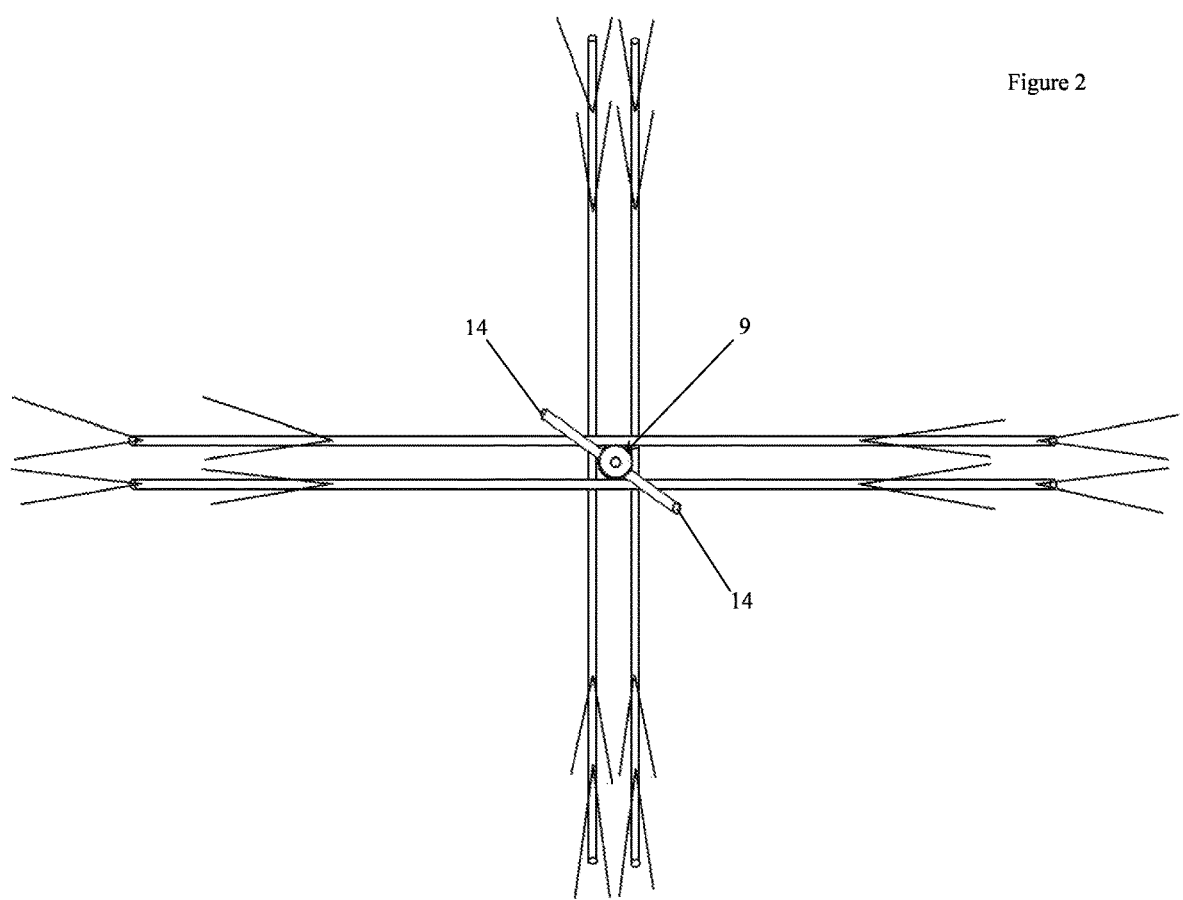
FIG. 2 illustrates a preferred embodiment of a camouflaging device having a mounting screw inserted through the mounting bracket.

FIG. 2 illustrates the mounting screw 9 positioned in the washer of the mounting bracket. The opposing arms 14 of the mounting screw are used to drive the substrate attaching end of the mounting screw into a substrate.

Figure 3:
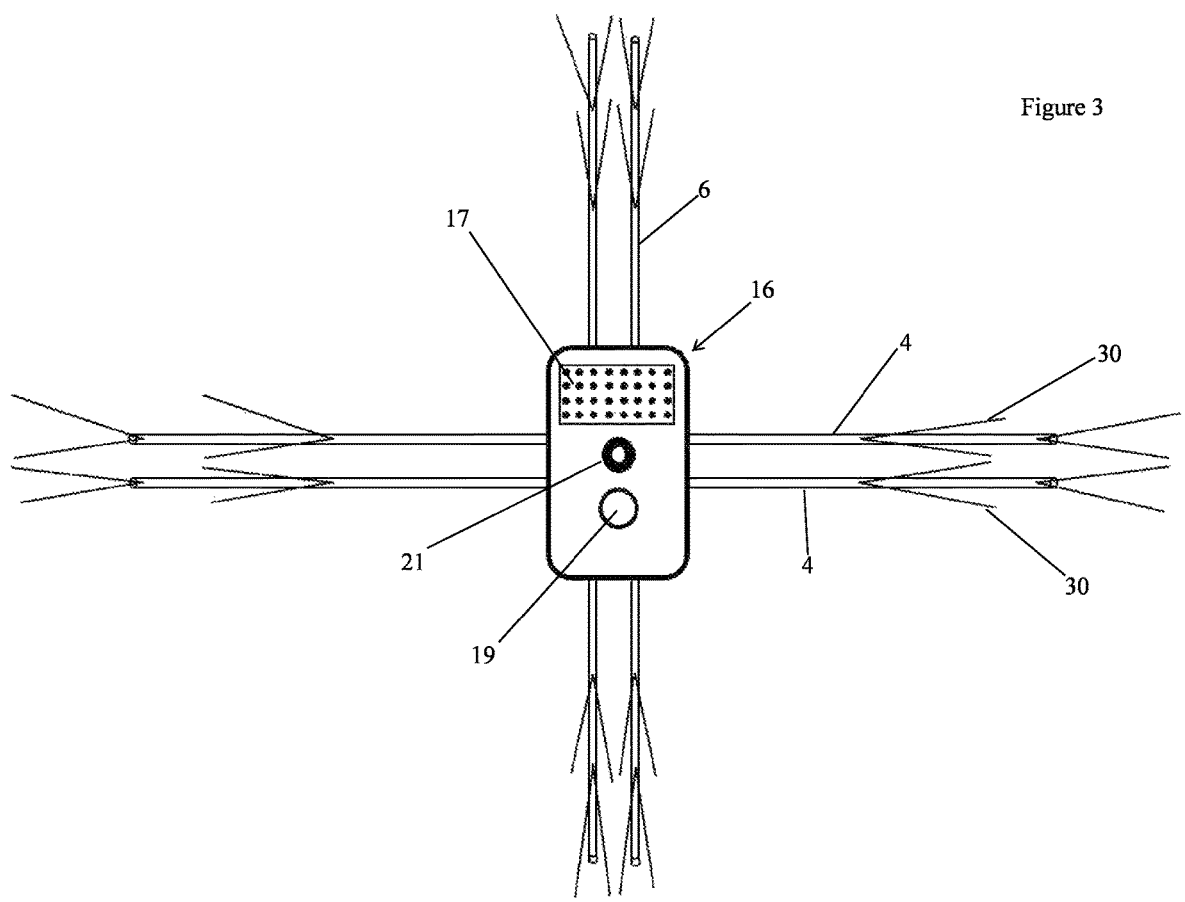
FIG. 3 illustrates the camouflaging device of FIGS. 1 and 2 with the trail camera attached to the camouflage device mounting screw.

FIG. 3 illustrates a trail camera 16 attached to the second end of the mounting screw and attached to the substrate. The arms 4, 6 are in an outstretched, straight position. Each arm is pliable so as to be bent but sufficiently resilient to retain the position in which the arm is bent.

Figure 4:
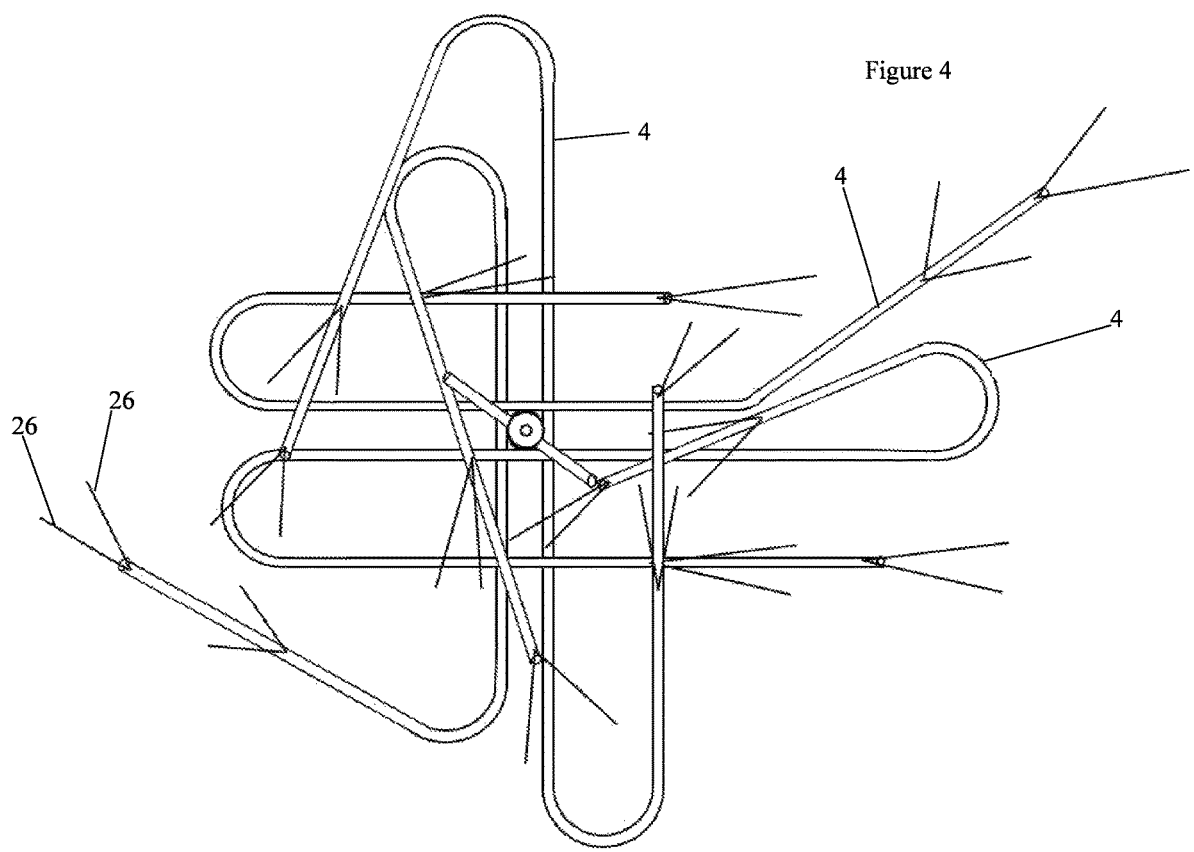
FIG. 4 illustrates the preferred embodiments of FIGS. 1-3 showing the mounting screw inserted into the mounting bracket with the flexible arms of the camouflaging device flexed and bent to provide a frame or structure onto which the foliage or other material is mounted to camouflage a trail camera.

FIG. 4 illustrates the device having the arms bent or flexed in various positions. The foliage and trail camera have been removed. The flexible arms can be bent and configured in a myriad of positions depending on the desired position and direction of the camera.

Figure 5:
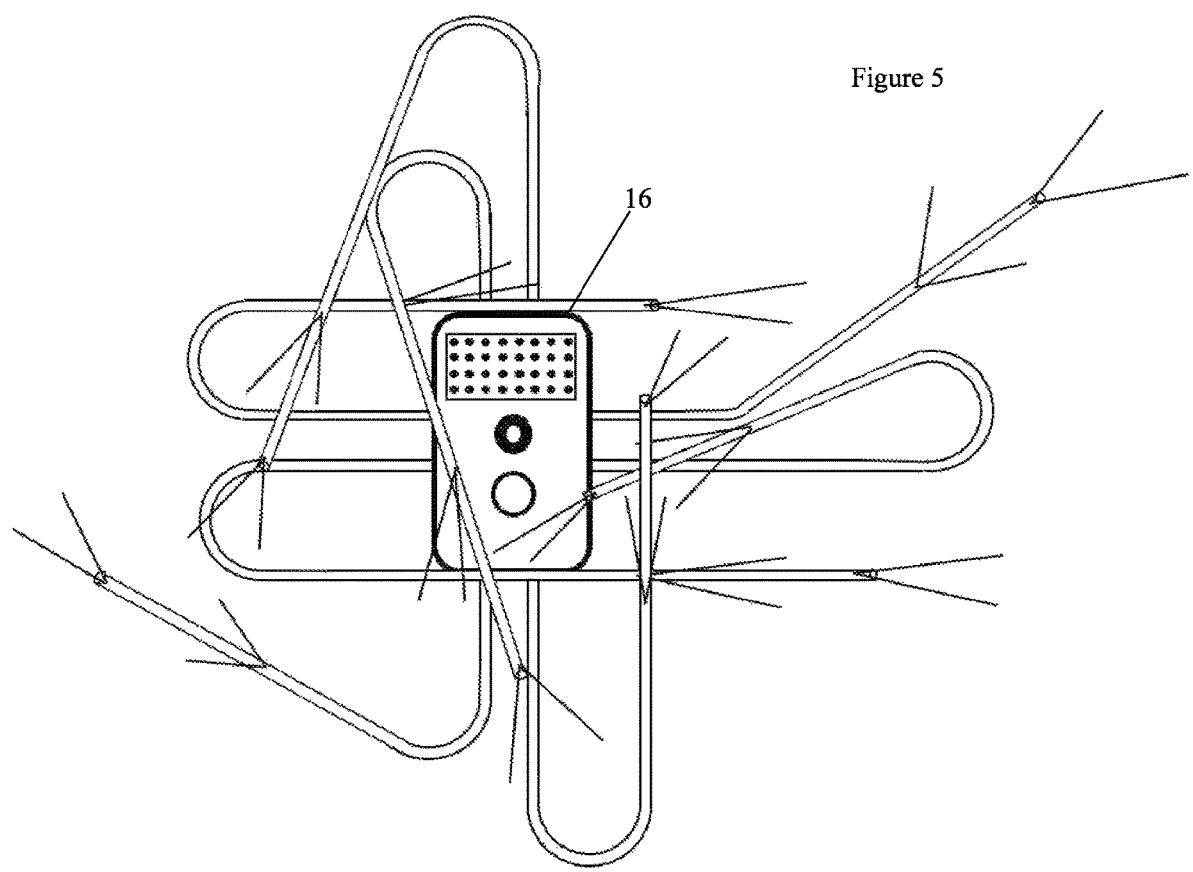
FIG. 5 illustrates a trail camera attached to the assembly of FIG. 4.

FIG. 5 illustrates the trail camera attached to the configuration of FIG. 4. The flexible fingers are shown without any attachment to foliage or any other material to illustrate the positioning of the arms or figures relative to the position of the trail camera.

Figure 6:
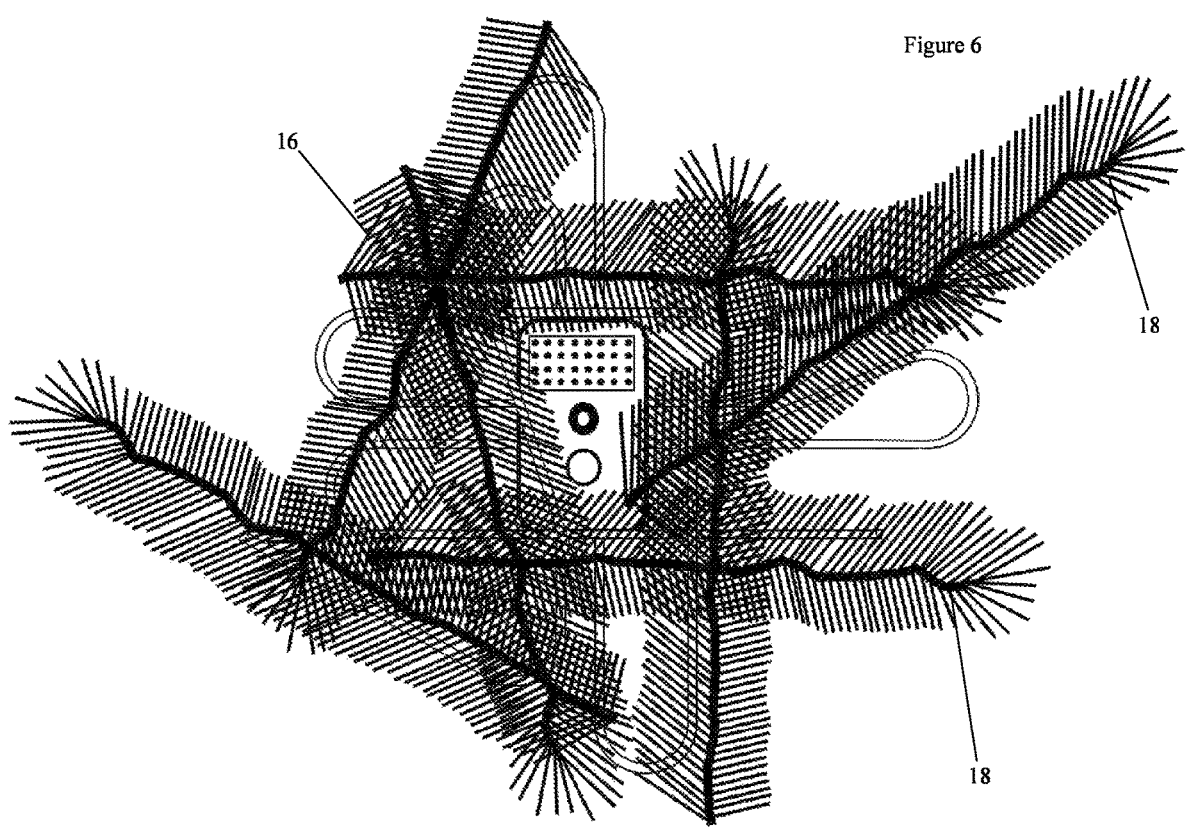
FIG. 6 illustrates foliage attached to the trail camera in assembly of FIG. 5.

FIG. 6 illustrates foliage attached to the camouflaging device by the flexible fingers. The foliage can be selected from the natural foliage in an area in which the camera is to be positioned. Alternatively, the user may use synthetic or artificial foliage or other camouflaging material. In the depicted embodiment, tree branches of a coniferous tree are used. As illustrated, the flexible arms of FIG. 6 are positioned with the foliage to block to outline of the trail camera. The sensors and camera lenses of the trail camera have not been covered. This camouflaging blocks the unnatural outline of the rectangular square trail camera.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A frame for mounting use in mounting and concealing a trail camera, said frame comprising:
    a mounting bracket configured for connection to a trail camera, wherein said mounting bracket defines an opening configured for receiving a mounting screw for attaching said mounting bracket to a substrate;
    a plurality of flexible arms extending from said mounting bracket, wherein said flexible arms are configured to be bent into a shape and configured to be resilient to retain said shape;
    a plurality of flexible fingers attached to said flexible arms, wherein said flexible fingers are configured for retaining a camouflaging material;
    a mounting device for attaching said mounting bracket to a substrate.

2. The camouflaging device of claim 1, wherein said mounting device comprises a mounting screw.

3. The camouflaging device of claim 2 wherein said mounting screw comprising a first end and a second end, wherein said first end of said mounting screw configured to attachment to the substrate by mounting screw threads, wherein said mounting screw comprises two opposing mounting screw arms configured or rotating said mounting screw to embed said mounting screw into a substrate, wherein said head comprises a threaded bolt configured for attaching to a trail camera.

4. The camouflaging device of claim 3, wherein said mounting bracket comprises a washer.

5. The camouflaging device of claim 3, wherein said second end of said mounting screw is configured to attach to a game camera.

6. The camouflaging device of claim 5, wherein said second end of said mounting screw comprises threads configured for threaded engagement with a female opening of the camera.

7. The camouflaging device of claim 1, wherein said mounting bracket is at an intersection of said plurality of flexible arms.

8. The camouflaging device of claim 7, wherein said mounting bracket comprises a washer, wherein said plurality of arms comprises four arms, wherein said four arms.

9. The camouflaging device of claim 1, wherein said flexible fingers are attached to said flexible arms at an end of said flexible arms.

10. The camouflaging device of claim 1, wherein said flexible fingers are attached to said flexible arms at a point between said mounting bracket and an end of said flexible arms.

11. The camouflaging device of claim 1, wherein said flexible arms comprise a metal material.

12. The camouflaging device of claim 1 wherein said flexible fingers comprise a clip.

13. The camouflaging device of claim 1 wherein each of said arms comprises eight flexible fingers.

14. The camouflaging device of claim 1 further comprising a camouflaging material retained by said fingers.

15. The camouflaging device of claim 14 wherein said camouflaging material comprises a synthetic material.

16. The camouflaging device of claim 14 wherein said camouflaging material comprises a natural material.

17. The camouflaging device of claim 1 further comprising a trail camera attached to said mounting bracket.

* * * * *